Patented Sept. 9, 1924.

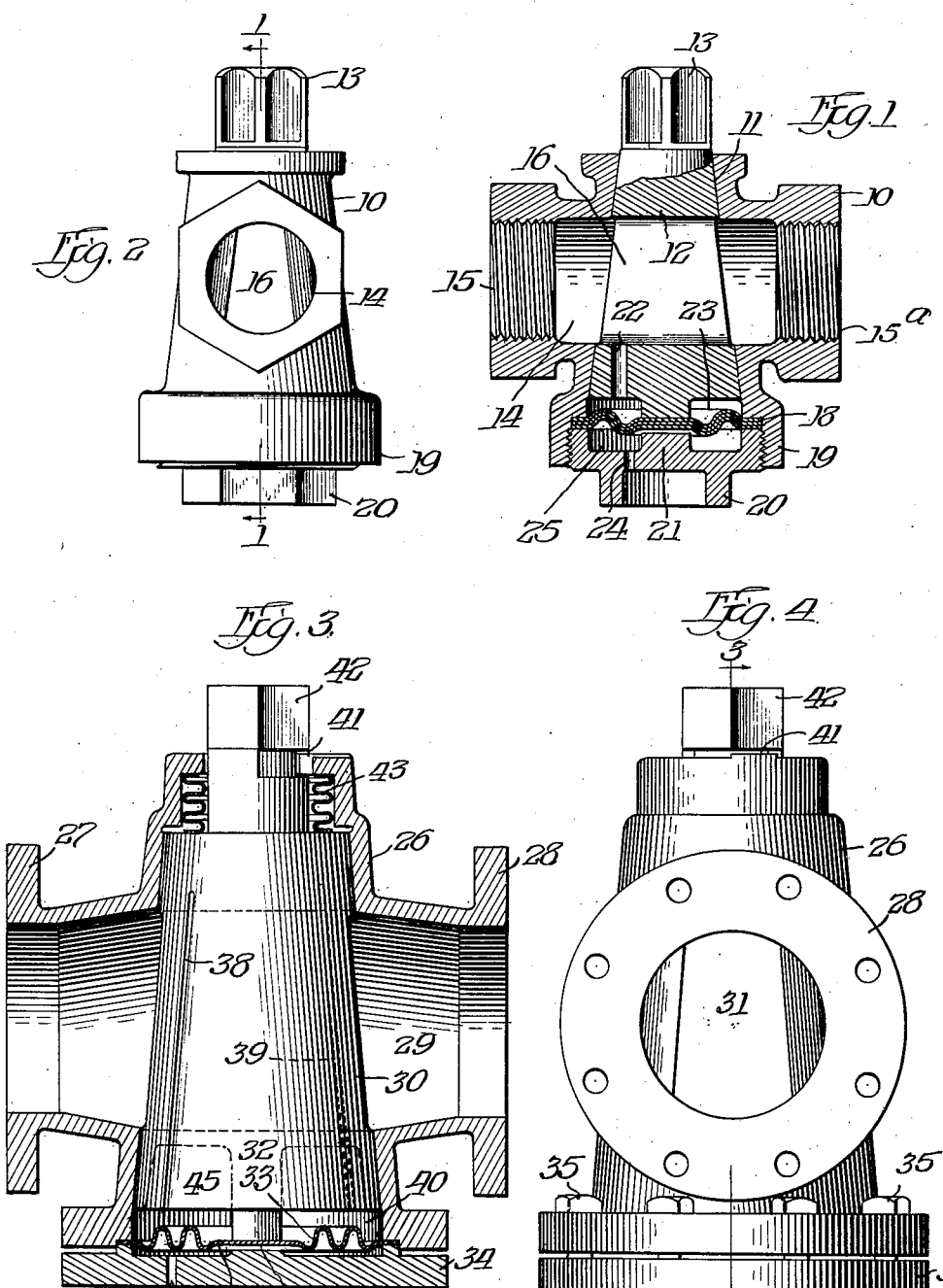

1,507,828

UNITED STATES PATENT OFFICE.

PHILIP S. HARPER, OF CHICAGO, ILLINOIS.

VALVE.

Application filed October 8, 1921. Serial No. 506,505.

*To all whom it may concern:*

Be it known that I, PHILIP S. HARPER, a citizen of the United States, residing at Chicago, in the county of Cook and State of Illinois, have invented certain new and useful Improvements in Valves, of which the following is a specification.

My invention relates to valves and particularly to such valves as are closed by rotary motion alone and in which the movable closing member is frequently made in the form of a tapered plug as in the common so-called plug valve or in the form of a disc as in valves regularly used for the operation of air brake equipment.

My invention consists essentially in providing a piston member or its equivalent to counteract or modify the forces exerted on the rotary closing member by the fluid pressure under which the valve is operating.

In valves as at present constructed, particularly of the inverted key type, the seating effect on the closing member is that due to a spring and to the fluid pressure within the valve combined which causes too great a seating force under many operating conditions. In my invention the seating force of the fluid pressure is counteracted so that the closing member is seated at all times with a force substantially equivalent to that of the pressure of the spring alone.

The principal object of my invention is to provide a valve of the type specified in which the rotary closing member is kept in more proper bearing against the seat or body member than in such valves as at present constructed.

Another and further object of my invention is the provision of a valve which is always seated with sufficient force to prevent dirt and other foreign matter from working into the bearing surfaces and at the same time a valve which can be readily operated under maximum fluid pressure.

A further object of my invention is a valve which is readily adaptable to lubrication of the bearing surfaces in the manner disclosed in my co-pending application, Serial Number 506,506, filed Oct. 8, 1921.

These and other objects of my invention will be more fully and better understood by referring to the accompanying drawings, in which:

Figure 1 is a view partially in section and partially in elevation showing my improved valve structure taken along the line 1—1 of Figure 2;

Figure 2 is an end view in elevation of the valve shown in Figure 1;

Figure 3 is a sectional elevation taken along the line 3—3 of Figure 4 showing a modified form of my invention; and Figure 4 is an end elevation of the valve shown in Figure 3.

Referring now specifically to the drawings, and particularly to Figure 1 and Figure 2, in which like reference characters refer to like parts throughout, a valve body 10 is shown having a tapered opening 11 extending vertically therethrough within which a tapered plug 12 is seated with a tight and properly ground joint so that said plug may be rotated on a vertical axis by any suitable handle placed on the square end 13 of the said plug 12. The valve body 10 is provided with a horizontally extending passage 14 therethrough and has a threaded end 15 to which a pipe (not shown) is secured and another threaded end 15$^a$ to which a pipe is also secured in the usual manner. The plug 12 has a transverse opening 16 therethrough which is in alignment with the passage 14 when the valve is in open position and at right angles to the passage 14 when the valve is in closed position. At the lower portion of plug 12 is a projection 17 which seats upon the diaphragm 18 composed in this instance of a plurality of disc members placed one upon the other as many as may be desired. Cast at the lower portion of valve body 10 and integrally therewith is an enlarged portion 19 in which a threaded cap 20 is screwed which serves to maintain the diaphragm 18 in proper position against the projection 17 of plug 12 and at the same time to clamp the said diaphragm 18 around its periphery against the body member 10 as shown making a tight joint. The threaded cap 20 has an internal central projection 21 which is normally out of engagement with the diaphragm 18 but which acts as a stop to limit the deflection of said diaphragm in order to prevent injury in case of excess pressure upon the valve. Extending vertically from the passage 16 in the plug 12 is a passage 22 which leads to a chamber 23 below the end of plug 12 and above the diaphragm 18. A small passage 24 extends from chamber 25 below the diaphragm 18 to the atmosphere allowing atmospheric pressure to act on the under side of said diaphragm.

Referring now to Figure 3 and Figure 4 which show a modified form of my invention, a valve body 26 has flanged openings 27 and 28 for the connection of piping, the said openings 27 and 28 being connected by a passageway 29 which passageway is intercepted by a plug member 30 extending transversely through the said valve body 26. The plug member 30 is ground to a taper so as to fit and form a good bearing into similarly tapered hole in valve body 26 and the said plug member has a passageway 31 which registers with passageway 29 in the valve body 26 with the valve in open position. A projection 32 on plug member 30 bears on a spring diaphragm 33 composed in this instance of a single member, said diaphragm exerting a sufficient force to hold said plug member firmly seated. The spring diaphragm 33 is clamped at its periphery by flanged cap member 34 by means of a plurality of bolts 35 so as to make a tight joint between said diaphragm and said valve body 26. The raised projection 36 in flanged cap member 34 acts as a stop determining the maximum outward position of spring diaphragm 33 and the port 37 allows atmospheric pressure to act on the under side of said diaphragm 33. Cut into the bearing surface of the plug member 30 and extending vertically thereon are lubrication grooves 38 and 39 which extend from a point in the upper part of the said bearing surface into a chamber 40 above the spring diaphragm 33. The said lubrication grooves are cut on opposite sides of the plug member 30 and at an angle of approximately forty-five degrees from the axis of passageway 31 through the said plug member 30. A stop 41 is provided at the top of the valve being a projection cast integrally with valve body 26 and extending into a suitable depression in the upper portion of plug member 30. A rotation of the plug member 30 through a quarter turn by means of any suitable handle placed on the square end 42 of the said plug member will open or close the valve as the case may be but the aforementioned stop 41 is so placed as to prevent lubrication grooves 38 and 39 at any time from being turned so as to open into the fluid passageway 29. A bellows type spring 43 is provided in the upper portion of the valve body 26 which bears upon and exerts a force downward against the plug member 30. The chamber 40 at the bottom of plug member 30 and above the spring diaphragm is enlarged by a recess 45 cut into the lower end of the plug member 30 to provide means for holding a supply of lubricant as described in my co-pending application referred to heretofore.

As to the operation and action of my invention, with the valve in Figure 1 and Figure 2 in open position as shown and with no fluid pressure in passage 14 the tapered plug 12 is firmly forced against its seat by the spring pressure of diaphragm 18. Under the changed condition when there is a fluid pressure in passage 14, there is a communication of such fluid pressure through the passage 22 to the chamber 23 below the plug member 12 and consequently an additional force is exerted upon the plug member 12 which acts to hold the said plug member more securely against its seat, but the same fluid pressure in the chamber 23 also exerts a downward force against the spring diaphragm 18 counteracting the lifting effect of the said diaphragm against the plug member 12. By a proper proportion of the spring members making up the diaphragm 18 or by changing the shape of the said members to be equivalent to a piston of greater or less area as required, we may cause the increased force against the plug member 12 due to the direct fluid pressure to be equal to the aforesaid decreased amount of force of the spring diaphragm 18 against the said plug member due to the same factor and in consequence of the foregoing we will have the plug member always held against its seat with the same degree of force and, therefore, properly seated. When the valve is in closed position with the pressure in chamber 23 indeterminate in consequence, we will still have substantially the same condition, i. e., the plug seated with a constant force, regardless of the fluid pressure under which the valve is operating. An approximation of such a condition is very satisfactory for the proper working of a valve of the type specified. Obviously for all the foregoing conditions to prevail the original force of the spring diaphragm should be made equal to or greater than the force which the maximum working fluid pressure alone would exert against the plug.

The action of the valve shown by Figure 3 and Figure 4 is the same as in the structure formerly described except that there is no direct connection between the fluid passage 29 and the chamber 40, except by leakage into the lubrication grooves 38 and 39 and thence to the said chamber, such leakage always being more or less present so that the pressures are always equalized between the aforesaid points after a short period. The balancing action of the spring diaphragm therefore as a piston equivalent is the same as previously described. But in the former valve in order to have the desired condition of the plug member seated at all times with a constant force the pressure of the plug member against its seat could not be less than that due to the maximum working fluid pressure alone. In the larger sized valves and with the higher working fluid pressures such a force is too great since it prevents the plug member from being readily turned. Consequently in such valves and for such service an upper spring member such as 43 is provided to exert a constant downward force against the rotary closing member such as the plug 30 and it can be seen without further explanation that by the addition of this spring member 43 to the former structure we may design a valve in which the plug member is at all times held against its seat with substantially the same constant force regardless of the fluid pressure within working range and that such a force may be of any degree necessitated by service requirements.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my invention.

I claim:

1. In a valve, a body member, a rotary closing member having a bearing in the said body member and having an operating stem extending from one end thereof, a diaphragm member positioned in a plane at right angles to the axis of rotation of said rotary closing member, the said diaphragm being subjected on its side toward the operating stem of said rotary closing member to the fluid pressure within the valve, and on its other side to the external atmospheric pressure, and means of connection between the said rotary closing member and the said diaphragm member.

2. In a valve, the combination of a body member having a vertical and horizontal passage therein, a rotary plug member seated in said vertical passage, means for closing the lower end of said vertical passage and a metal diaphragm carrying said plug member and exerting a pressure thereon in a forward direction, the operating stem of the said rotary plug member being placed at the opposite end of said plug from the said metal diaphragm.

3. A plug valve having a valve body with a tapered plug therein said plug having an operating stem at its smaller end, a cap member closing the said valve body at the large end of the said tapered plug, a diaphragm of flexible metal clamped between said cap member and said valve body, the said diaphragm maintaining the said tapered plug member in proper seated relation.

4. In a valve, a body member, a member with a bearing in said body member arranged to close said valve by rotary motion, a spring diaphragm exerting a force upon the said rotary closing member, and a spring member exerting its force in contrary direction to the said diaphragm.

5. A plug valve having a valve body, a tapered plug seated therein and arranged to open and close the said valve by rotary motion, a cap member closing the said valve body at the large end of the said tapered plug, a diaphragm of flexible metal clamped between said cap member and said valve body, the said diaphragm of flexible metal maintaining the said tapered plug in proper seated relation, and a spring member exerting its force upon said plug in contrary direction to the said diaphragm.

Signed at Chicago, Illinois, this 27th day of September, 1921.

PHILIP S. HARPER.